(12) United States Patent
Van Eikema Hommes et al.

(10) Patent No.: US 8,352,791 B2
(45) Date of Patent: Jan. 8, 2013

(54) CONFIGURABLE TEST SUITE

(75) Inventors: Onno R. Van Eikema Hommes, West Bloomfield, MI (US); Richard L. Schupbach, Commerce Township, MI (US); James K. Thomas, Northville, MI (US)

(73) Assignee: GM Global Technology Operations LLC, Detroit, MI (US)

( * ) Notice: Subject to any disclaimer, the term of this patent is extended or adjusted under 35 U.S.C. 154(b) by 173 days.

(21) Appl. No.: 12/794,398

(22) Filed: Jun. 4, 2010

(65) Prior Publication Data
US 2011/0302472 A1 Dec. 8, 2011

(51) Int. Cl.
*G06F 11/00* (2006.01)

(52) U.S. Cl. ............ 714/26; 714/25; 714/32; 714/35; 714/37; 714/38.1; 714/742

(58) Field of Classification Search ............. 714/25, 714/26, 32, 35, 37, 38.1, 742
See application file for complete search history.

(56) References Cited

U.S. PATENT DOCUMENTS

| | | | | |
|---|---|---|---|---|
| 5,671,141 A * | 9/1997 | Smith et al. | .................. | 701/33.6 |
| 6,085,244 A * | 7/2000 | Wookey | ..................... | 709/224 |
| 6,178,533 B1 * | 1/2001 | Chang | ........................... | 714/739 |
| 7,085,964 B2 * | 8/2006 | Fournier et al. | ................. | 714/33 |
| 7,627,843 B2 * | 12/2009 | Dozorets et al. | ............. | 716/106 |
| 7,747,908 B2 * | 6/2010 | Choudhury et al. | ............ | 714/56 |
| 7,757,121 B1 * | 7/2010 | Perron et al. | .................... | 714/26 |
| 7,917,814 B2 * | 3/2011 | Hu et al. | ......................... | 714/57 |
| 8,001,423 B2 * | 8/2011 | Spier et al. | ..................... | 714/26 |
| 8,135,509 B1 * | 3/2012 | Thompson et al. | .......... | 123/399 |
| 2005/0268171 A1 * | 12/2005 | House et al. | .................... | 714/32 |
| 2005/0273685 A1 * | 12/2005 | Sachdev et al. | ............... | 714/742 |
| 2006/0179386 A1 * | 8/2006 | Pushpavanam et al. | ...... | 714/742 |
| 2008/0189488 A1 * | 8/2008 | DeWitt et al. | .................. | 711/132 |
| 2008/0263399 A1 * | 10/2008 | Cousin et al. | ................... | 714/26 |
| 2009/0292952 A1 * | 11/2009 | Merry | ............................. | 714/38 |
| 2010/0083056 A1 * | 4/2010 | Spier et al. | ..................... | 714/47 |
| 2010/0229036 A1 * | 9/2010 | Goyal et al. | .................... | 714/25 |
| 2010/0229044 A1 * | 9/2010 | Fountain et al. | ............... | 714/37 |
| 2011/0099424 A1 * | 4/2011 | Rivera Trevino et al. | ...... | 714/25 |
| 2011/0137711 A1 * | 6/2011 | Singh et al. | .................. | 705/7.38 |
| 2011/0231708 A1 * | 9/2011 | Lawrance et al. | ............ | 714/38.1 |

\* cited by examiner

*Primary Examiner* — Joshua P Lottich (57) ABSTRACT

A system and method for testing a control module includes a microprocessor, where the microprocessor has a programming environment. The programming environment has a test data structure, a configuration data structure, and a monitor data structure each containing data. At least one test data instance is associated with the test data structure and at least one configuration data instance is associated with the configuration data structure. The configuration data instance is a diagnostic test that monitors a parameter of the microprocessor, and the monitor data structure creates the test data instance such that each test data instance corresponds to one of the configuration data instances. The program includes a first control logic for associating the test data structure, the configuration data structure and the monitor data structure as part of a core infrastructure portion of the programming environment, where the core infrastructure portion of the program is static.

20 Claims, 6 Drawing Sheets

CONFIGURABLE TEST SUITE

FIELD

The present disclosure relates to a system and method of testing a microprocessor, and in particular to a system and method of testing a microprocessor that has a program having a static portion and a dynamic portion.

BACKGROUND

The statements in this section merely provide background information related to the present disclosure and may or may not constitute prior art.

Health monitor testing systems are typically used to check for errors that are produced by the hardware or software of a computing system's microprocessor. The testing system includes a test suite that performs a sequence of tests to monitor different parameters of the microprocessor. Determining which tests to include in the testing sequence is an important factor to consider when designing a test suite, as performing too many tests can be potentially costly and wastes computer memory as well as CPU throughput. At the same time, it is desirable to provide a testing system that can be reusable depending on the type of microprocessor that is to be tested.

The test suite can include multiple tests, where each test monitors a parameter of the microprocessor. Different types of tests are included with the test suite depending on the type of microprocessor that is utilized. For example, a body control module will typically include different tests when compared to a battery contact module. In one approach, the test suite only includes the tests that are common between the different microprocessors. However, when using this approach each microprocessor is left to determine how to implement the remaining tests that are not included with the test suite. In an alternative example, a superset of tests are stored in memory, where the superset of tests encompass all the different tests that are used for different microprocessors. For example, the test suite could include all of the tests needed for both the body control module as well as the battery contact module. However this approach results in unnecessary tests performed on both the microprocessors.

While current health monitor testing systems achieve their intended purpose, there is a need for a new and improved testing system which exhibits improved performance from the standpoint of reusability and also reduces wasted computer memory and CPU throughput.

SUMMARY

The present invention provides a control module having a microprocessor including a programming environment. The programming environment has a test data structure, a configuration data structure, and a monitor data structure each containing data. At least one test data instance is associated with the test data structure and at least one configuration data instance is associated with the configuration data structure. The configuration data instance is a diagnostic test that monitors a parameter of the microprocessor. The monitor data structure creates the test data instance such that each test data instance corresponds to one of the configuration data instances.

The program includes first control logic for associating the test data structure, the configuration data structure and the monitor data structure as part of a core infrastructure portion of the programming environment, where the core infrastructure portion of the program is static. The program also includes a second control logic for associating the configuration data instance in a deployment-specific portion of the program, where the deployment-specific portion of the program is dynamic. The program also includes a third control logic for executing the configuration data instance that is the diagnostic test to monitor one of the parameters of the microprocessor. The program includes a fourth control logic for monitoring the microprocessor for a data signal indicating that an error code has been generated. The error code is generated by executing the configuration data instance. Finally, the program includes a fifth control logic for storing the results of the diagnostic test in the test data instance.

In an embodiment of the present invention, each diagnostic test is deployed at an offset, wherein the offset represents a delay in time.

In another embodiment of the present invention, the delay in time is about 1000 milliseconds.

In yet another embodiment of the present invention, the test data structure includes thirty-two diagnostic tests.

In an embodiment of the present invention, the configuration data structure includes up to thirty-two diagnostic tests.

In another embodiment of the present invention, the system includes an execution mode. The execution mode determines if a specific diagnostic test executes depending on if the microprocessor is in one of startup, run time mode and shutdown.

In yet another embodiment of the present invention, the control module is one of an airbag control module, a body control module, an engine control module, a powertrain control module, a vehicle integration control module, or a transmission control module.

In an embodiment of the present invention, a DTC ID (diagnostic trouble code identification) is associated with each error code.

In an embodiment of the present invention, a plurality of fault severity levels are associated with the error code.

In another embodiment of the present invention, multiple configuration data instances that are diagnostic tests are used to monitor different parameters of the microprocessor.

In yet another embodiment of the present invention, one of the diagnostic tests is a stack usage test that indicates a percentage of stack utilized.

In yet another embodiment of the present invention, a method of testing a control module having a microprocessor includes a program. The program includes a test data structure, a configuration data structure, and a monitor data structure. At least one test data instance is associated with the test data structure and at least one configuration data instance is associated with the configuration data structure. The configuration data instance is a diagnostic test that monitors a parameter of the microprocessor, and the monitor data structure creates the test data instance such that each test data instance corresponds to one of the configuration data instances. The method includes the step of associating the test data structure, the configuration data structure, and the monitor data structure with a core infrastructure portion of the program. The configuration data instance is associated with a deployment-specific portion of the program, where the core infrastructure portion of the program is static and the deployment-specific portion of the program is dynamic. The method also includes the step of executing the configuration data instance, where the configuration data instance is the diagnostic test that monitors one of the parameters of the microprocessor. The method further includes the step of monitoring the microprocessor for a data signal indicating that an error code has been generated by the diagnostic test being executed. The error code is generated by executing the configuration data instance. Finally, the method includes the step of storing results of the diagnostic test in the test data instance.

In an embodiment of the present invention, the method further comprises the step of monitoring the microprocessor for data signals indicating that the error code has been generated.

In another embodiment of the present invention, the method further comprises the step of deploying each diagnostic test at an offset, wherein the offset represents a delay in time.

In yet another embodiment of the present invention, the delay in time is about 1000 milliseconds.

In an embodiment of the present invention, the method further comprises the step of executing a specific diagnostic test depending on an execution mode. The execution mode determines if the specific diagnostic test executes depending on if the microprocessor is in one of startup, run time mode and shutdown.

In an embodiment of the present invention, the method further comprises the step of establishing a first fault severity level associated with the configuration data structure. The first fault severity level indicates a level of severity of one of the diagnostic tests if the error code is generated by the microprocessor. There are eight levels of severity for the first fault severity level.

In another embodiment of the present invention, the method further comprises the step of establishing a second fault severity level associated with the monitor data structure. The second severity level indicates which of the eight levels of severity the first fault severity level is generated.

In yet another embodiment of the present invention, the method further comprises the step of establishing an eight-bit set that is associated with the second fault severity level of the monitor data structure. Each bit of the eight-bit set corresponds to one of the eight levels of severity for the first fault severity level.

In an embodiment of the present invention, the method further comprises the step of establishing multiple configuration data instances that are diagnostic tests which are used to monitor different parameters of the microprocessor.

Further areas of applicability will become apparent from the description provided herein. It should be understood that the description and specific examples are intended for purposes of illustration only and are not intended to limit the scope of the present disclosure.

DRAWINGS

The drawings described herein are for illustration purposes only and are not intended to limit the scope of the present disclosure in any way.

DETAILED DESCRIPTION

The following description is merely exemplary in nature and is not intended to limit the present disclosure, application, or uses.

Figure 1:
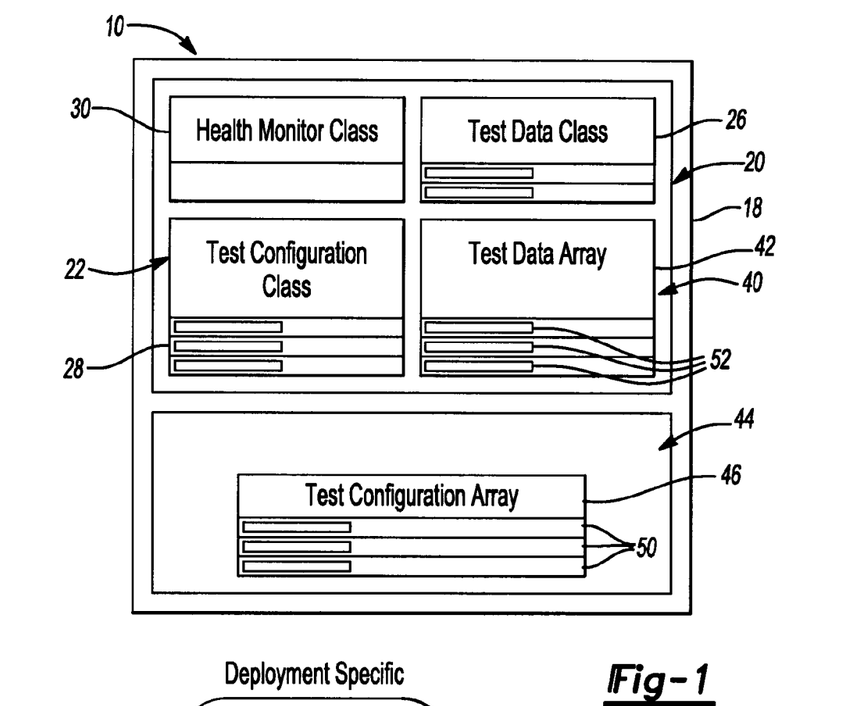
FIG. 1 is a schematic illustration of an exemplary control module having a microprocessor, where the microprocessor has a programming environment.

With reference to FIG. 1, a schematic illustration of an exemplary testing system is indicated by reference number 10. The testing system 10 is used to monitor a control module 18 that is preferably an electronic control device having a preprogrammed digital computer or processor, control logic, memory used to store data, and at least one I/O peripheral. The control logic includes a plurality of logic routines for monitoring, manipulating, and generating data. The control module 18 includes a computer readable storage medium 20 and a program 22. In the embodiment as shown, the program 22 is an object oriented programming environment. The program 22 is used to manipulate data and includes a plurality of different data structures. In the embodiment as shown, the data structures are shown as data classes, however it is understood that any type of data structure that stores and organizes data may be used as well. The program 22 includes three different data structures that are shown as a test data class 26, a test configuration class 28, and a health monitor class 30.

The control module 18 can be any type of embedded controller responsible for controlling a particular system such as, for example, various systems of an automobile. Specifically, the control module 18 could be an airbag control module, a body control module, a battery contact module, an engine control module, a powertrain control module, a vehicle integration control module, or a transmission control module. The control module 18 includes a microprocessor, a random access memory (RAM), a read only memory (ROM), and an input/output interface (not shown). The testing system 10 is used to run diagnostic tests that monitor various parameters of the microprocessor associated with the control module 18. The diagnostic tests check for errors that are produced by the hardware or software of the control module's 18 microprocessor, and are an indication of the health of the control module 18.

Figure 2:
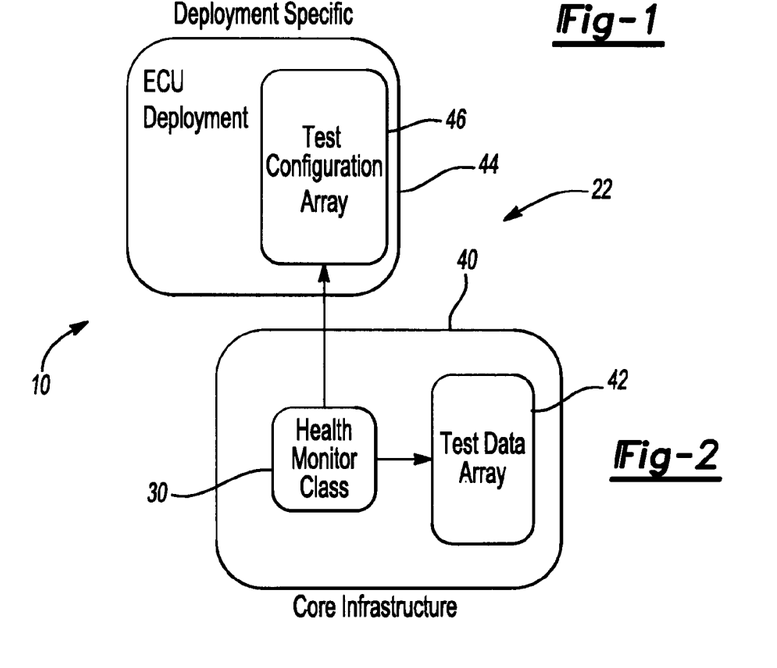
FIG. 2 is a block diagram illustrating the programming environment illustrated in FIG. 1.

Referring now to FIG. 2, a diagram illustrates how the testing system's 10 instances are grouped together to allow for a configurable, deployment-specific test suite. Specifically, the program 22 includes a reusable core infrastructure 40 that includes the health monitor class 30 and a test data array 42 that is associated with the test data class 26 (FIG. 1). Referring to FIGS. 1-2, the test data class 26 and the test configuration class 28 are also part of the core infrastructure 40 as well. The data contained in the core infrastructure 40 is static. That is, the data contained in the core infrastructure 40 does not generally change during the life of the test system's software. The testing system 10 further includes a deployment-specific structure 44 that includes a test configuration array 46 that is associated with the test configuration class 28 (FIG. 1). The deployment-specific structure 44 is dynamic. That is, the data stored in the deployment specific structure 44 is configurable and can be changed during the lifetime of the testing system's software. The health monitor class 30 points to the test data array 42 and the test configuration array 46 during initialization, where the health monitor class 30 is assigned one test data array 42 as well as one test configuration array 46.

The test configuration array 46 includes a plurality of instances 50 (shown in FIG. 1) that are configurable depending on the type of control module 18 that is to be monitored.

The instances are diagnostic tests that are used to monitor a particular parameter of the microprocessor of the control module 18. The diagnostic tests that are used to monitor a microprocessor such as a body control module are typically different from the diagnostic tests that are used to monitor a microprocessor such as a battery contact module. Therefore, the instances 50 are configurable depending on the type of microprocessor that is used. In one embodiment, the test configuration array 46 includes up to thirty-two diagnostic tests 50, however it is understood that any number of diagnostic tests may be included as well. The test data array 42 includes instances 52 (shown in FIG. 1), each of which correspond to one of the instances 50 of the test configuration array 46. Specifically, the monitor class 30 is employed to create one instance 52 of the test data array 42 for each instance 50 of the test configuration array 46. The instances 50 of the test configuration array 46 are diagnostic tests that are executed by the microprocessor, and the results of each diagnostic test are stored in the instances 52 of the test data array 42. Thus, the instances 52 of the test data array 42 acts as a container to store the results of each instance 50 of the test configuration array 46. In one embodiment, the test data array 42 includes thirty-two diagnostic tests 52, however it is understood that any number of tests may be used as well.

The instances 50 of the test configuration array 46 can be configured so that any type or number of diagnostic tests can be included within the test configuration array 46. This is because the test configuration array 46 is stored in the deployment specific structure 44 program, where the test configuration array 46 is dynamic. This means that the test configuration array 46 can be configured to accommodate different types of control modules. Referring to TABLE 1, an exemplary set of diagnostic tests are illustrated for different types of control modules 18.

TABLE 1

| ECU 1 | ECU 2 |
|---|---|
| GetHWIO_Pct_StackUsage | GetHWIO_Pct_StackUsage |
| PerfmHWIO_b_ALU_Test | PerfmHWIO_b_ALU_Test |
| PerfmHWIO_b_ConfigRegTest | PerfmHWIO_b_ConfigRegTest |
| GetHWIO_e_ClkSt | GetHWIO_e_ClkSt |
| PerfmHWIO_e_MMUConfigTest | GetHWIO_e_SPI_TestStatus |
| PerfmHWIO_e_MMUTest | GetHWIO_b_SeedKeyStatus |

For example, ECU1 could be a body control module, while ECU2 could be a battery contact module. However, those skilled in the art will appreciate that other types of ECUs may be used as well. ECU1 includes a set of diagnostic tests that are unique to a body control module, and ECU2 includes a set of diagnostic tests that are unique to a battery contact module. In the embodiment as illustrated, the ECUs each include diagnostic tests that are common between both of ECU1 and ECU2, which are the tests labeled GetHWIO_Pct_StackUsage, PerfmHWIO_b_ALU_Test, PerfmHWIO_b_ConfigRegTest, and GetHWIO_e_ClkSt in TABLE 1. Each ECU also includes diagnostic tests that are unique to each ECU as well. Because the diagnostic tests are dynamic and stored in the deployment specific structure 44 (FIG. 2) of the control module 18, each control module 18 can have a configurable set of diagnostic tests that can be tailored depending on the type of control module that is employed. At the same time, each control module 18 also has the static core infrastructure 40 as well. The data stored in the core infrastructure 40 can remain the same between different control modules 18, while the deployment specific structure 44 can be modified to accommodate a particular application.

In the embodiment as illustrated in TABLE 1, ECU 1 and ECU 2 each include six diagnostic tests, however it is understood that any number or type of diagnostic tests may be used as well. The test GetHWIO_Pct_StackUsage which is included with both ECU 1 and ECU 2 returns the percentage of stack used. The test PerfmHWIO_b_ALU_Test which is included with both ECU 1 and ECU 2 returns a Boolean pass or a fail of the CPU's ALU test. The test PerfmHWIO_b_ConfigRegTest which is included with both ECU 1 and ECU 2 returns a Boolean pass or fail of the CPU's register test. The test GetHWIO_e_ClkSt which is included with both ECU 1 and ECU 2 returns an enumerated value indicating the state of the CPU's clock. The test PerfmHWIO_e_MMUConfigTest is included with ECU 1 and returns an enumerated value indicating the state of the CPU's memory management unit configuration. The test PerfmHWIO_e_MMUTest is also included with ECU 1 and returns an enumerated value indicating the state of the CPU's memory management unit. The test GetHWIO_e_SPI_TestStatus is included with ECU 2 returns an enumerated value indicating the state of the serial peripheral interface (SPI) communication. The test GetHWIO_b_SeedKeyStatus is also included with ECU 2, and returns a Boolean pass or fail of a seed and key test.

Figure 3:
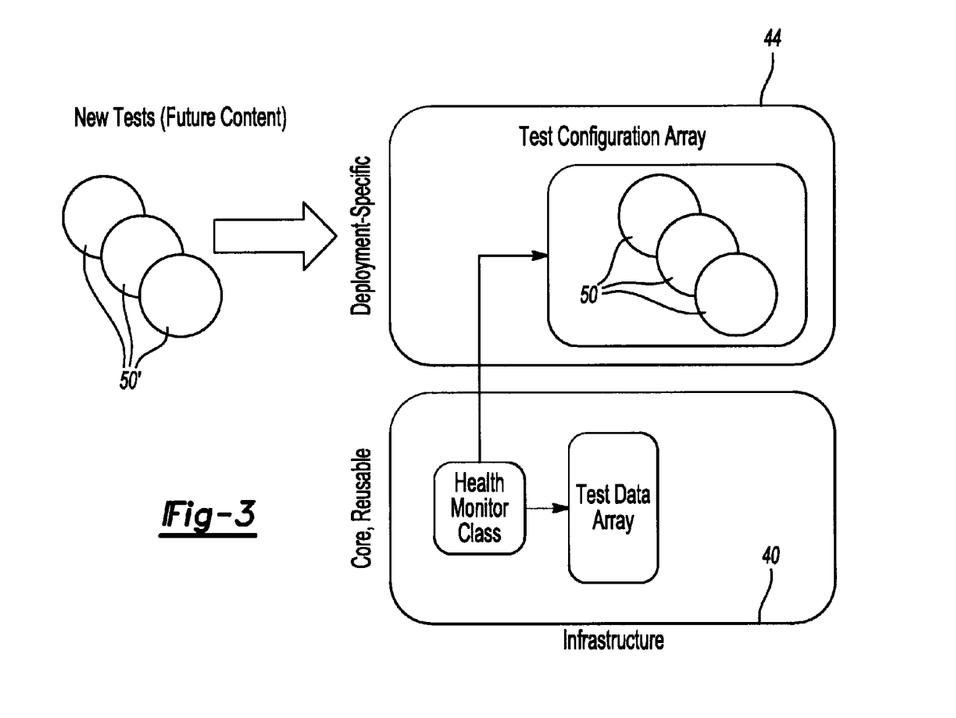
FIG. 3 is block diagram illustrating the programming environment in FIG. 2.

Another advantage of including the core infrastructure 40 is the ability to incorporate different tests during the life of the testing system's 10 software, while still being able to maintain the same core infrastructure 40. Turning to FIG. 3, if some or all of the diagnostic tests 50 of the test configuration array 46 need to be changed, this can be performed by switching the current diagnostic tests 50 with new diagnostic tests 50'. In this approach, the software included with the core infrastructure 40 remains unchanged, while only the software in the deployment specific structure 44 needs to be modified.

Figure 4:
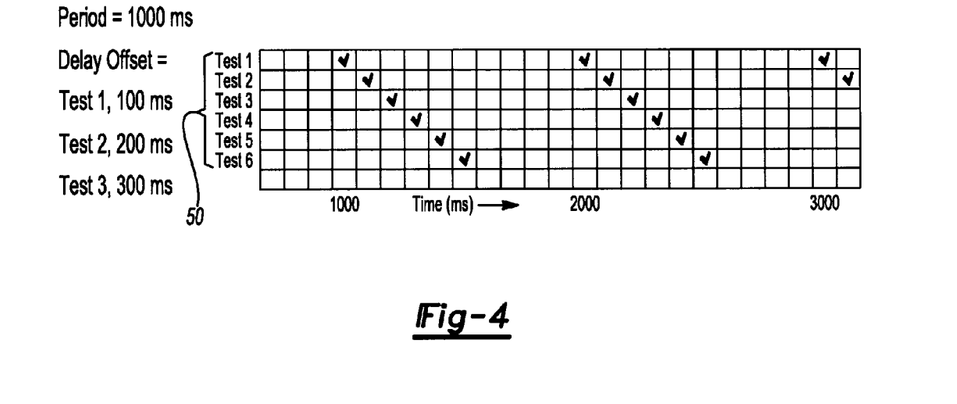
FIG. 4 is a chart illustrating the diagnostic tests being executed at a delay.
Figure 5:
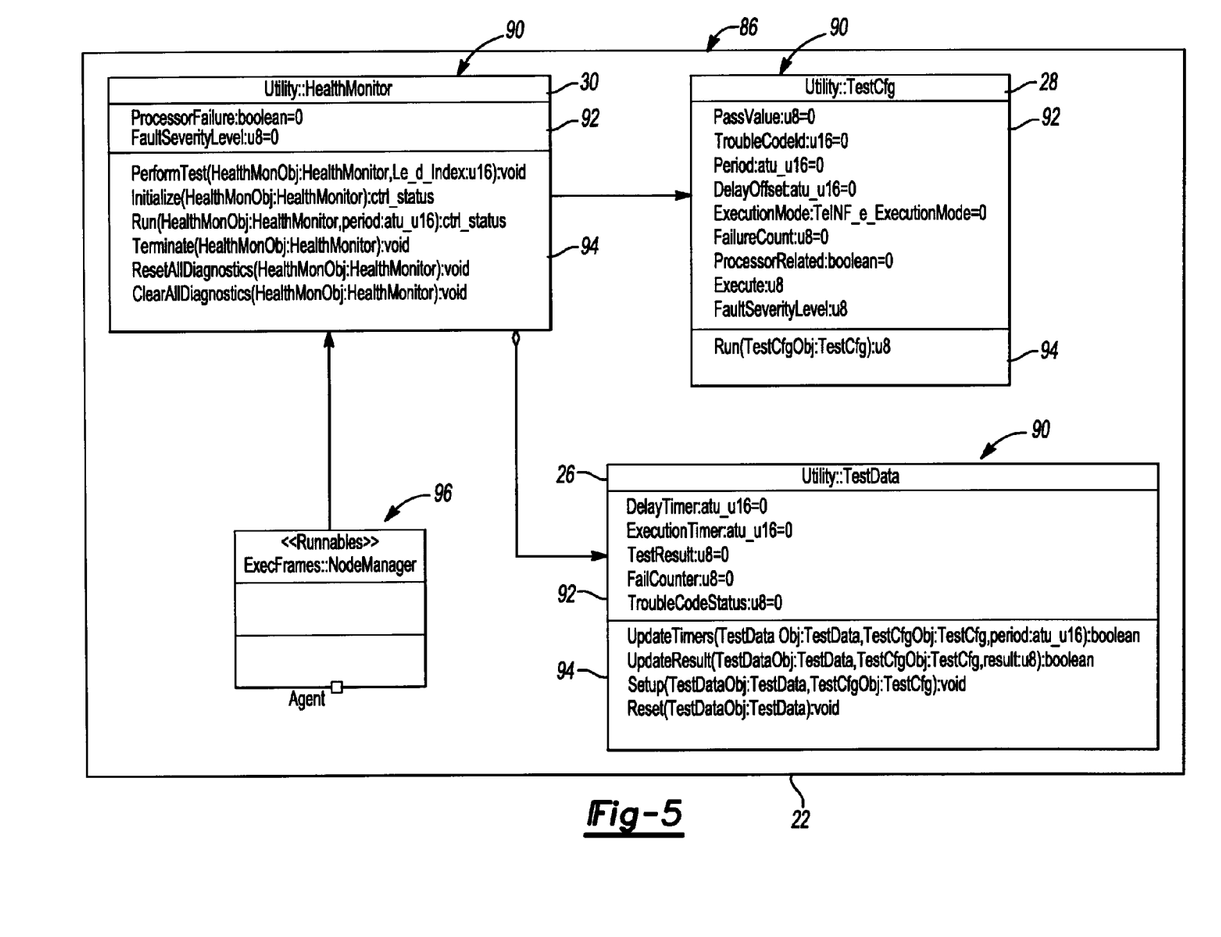
FIG. 5 is a class diagram that is part of the program illustrated in FIG. 1.

In one embodiment, the testing system 10 can be configured to minimize the impact of testing on the CPU utilization of the control module 18. Specifically, referring to FIG. 4, each of the tests that make up the diagnostic tests 50 of the test configuration array 46 (FIG. 2) can be delayed by a predetermined amount of time such that the diagnostic tests are staggered or offset. Offsetting each test will prevent all of the tests from running at the same time. Running each of the diagnostic tests at the same time creates a spike in CPU utilization of the control module 18. In the example as illustrated in FIG. 4, each of the diagnostic tests 1-6 include a period of 1000 milliseconds. Each diagnostic test is offset from one another by 100 milliseconds. Referring to FIG. 5, a class diagram of the program 22 of the control module 18 (FIG. 1) is illustrated. The test configuration class 28 (TestCfg) includes a plurality of attributes 92. One of the attributes 92 is the DelayOffset attribute, which allows for each of the diagnostic tests 50 of the test configuration class 28 that are scheduled at the same rate (i.e., the same period attribute atu_Period) to be offset. That is, the DelayOffset attribute prevents the diagnostic tests 50 that have the same period attribute atu_Period from deploying all at the same time, which reduces or prevents CPU throughput bottlenecks.

TABLE 2 is an exemplary table illustrating different possible values of an Execution Mode attribute of the testing system 10. The Execution Mode of the testing system 10 determines if the testing system 10 will execute a specific diagnostic test, depending if the microprocessor of the control module 18 (FIG. 1) is in startup mode, run time mode, or shutdown mode, or any combination of these modes. There are eight possible combinations of the Execution mode, where each of startup mode, run time mode and shutdown mode can be either active or disabled. Referring to FIG. 5, the Execution Mode is an attribute 92 of the test configuration class 28 (TestCfg).

Figure 7:
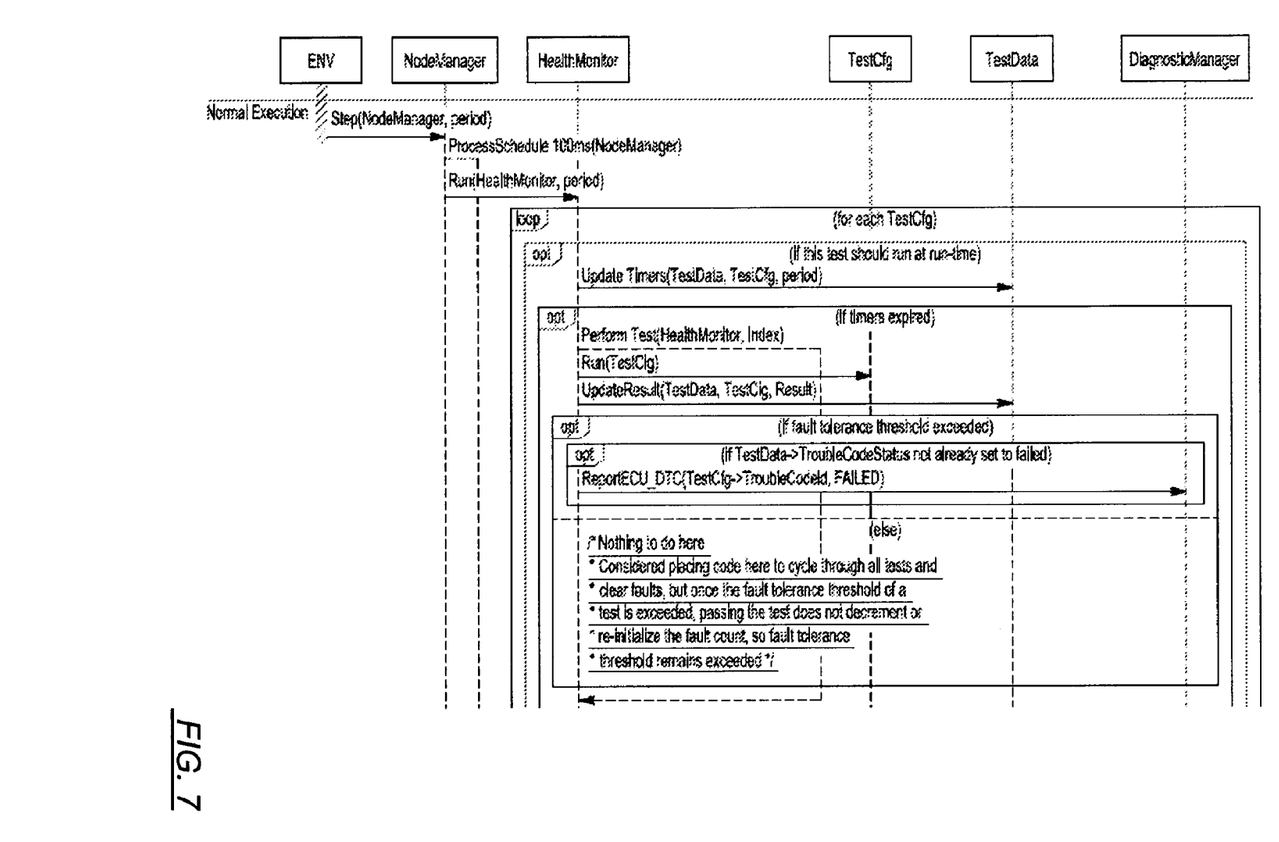
FIG. 7 is a sequence table for run time mode of a testing system.
Figure 8:
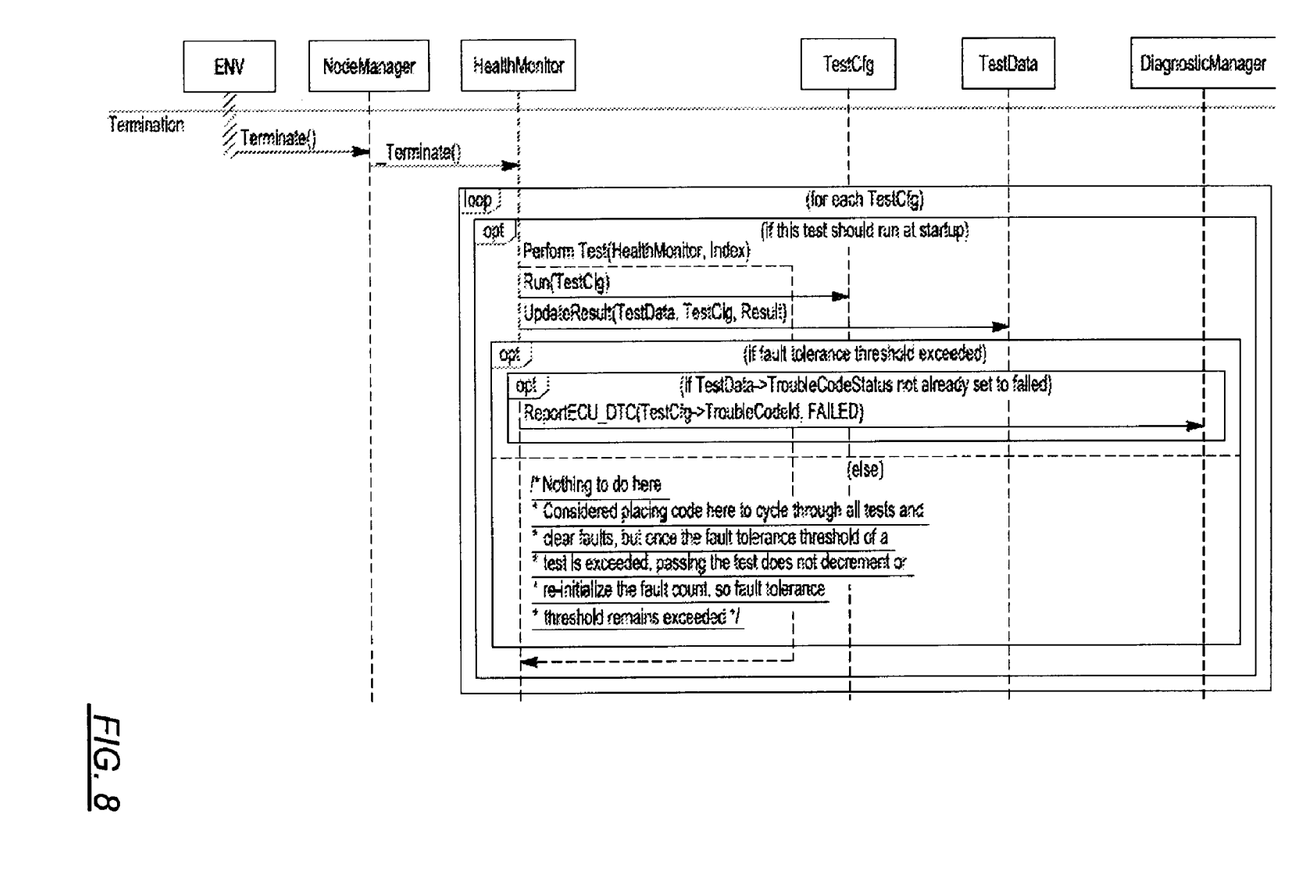
FIG. 8 is a sequence table for shutdown of a testing system.

The Execution Mode includes eight different possible values which correspond to the eight different combinations of the Execution Mode, however it is understood that fewer combinations of the Execution Mode may be used as well. If the Execution Mode value is set to DisableExecution, diagnostic testing in startup, run time mode, and shutdown will be disabled. If the Execution Mode value is set to OnlyStartupMode, diagnostic testing will only occur during startup. If the Execution Mode value is set to OnlyRunMode, diagnostic testing will only occur in run time mode. If the Execution Mode value is set to ExcludeShutdownMode, diagnostic will run only in startup and run time mode. If the Execution Mode value is set to OnlyShutdownMode, diagnostic testing will only run in shutdown mode. If the Execution Mode value is set to ExcludeRunMode, then diagnostic testing will only run in startup and shutdown. If the Execution Mode value is set to ExcludeStartupMode, then diagnostic testing is only run in run time mode and shutdown. Finally, if the Execution Mode value is set to AllModes, then diagnostic testing is run in startup, run time and shut down.

mode of the testing system 10 is illustrated. During run time mode, the health monitor class 30 executes the diagnostic tests that are intended to run during run time mode. The diagnostic tests that are performed during run time mode are determined based on the value of the Execution Mode. Finally, turning to FIG. 8, a sequence table for shutdown of the testing system 10 is illustrated. During shutdown, the health monitor class 30 executes diagnostic tests intended to run during shutdown. The diagnostic tests that are run during shutdown are determined based on the value of the Execution Mode. For example, if the value of the Execution Mode is set OnlyRunMode, then only the sequence table for run time mode is executed, and the diagnostic test for startup and shutdown are omitted.

FIG. 5 is an illustration of a class diagram 86 of the program 22 of the control module 18 (FIG. 1). The class diagram 86 includes the test data class 26, the test configuration class 28, and the health monitor class 30, which are represented as boxes 90. Each box 90 includes the name of the class, the attributes 92 and the operations 94 that the corresponding class can undertake. The class diagram 86 also illustrates a node manager 96 that is used to communicate data between the classes 26, 28 and 30. Each of the test data class 26, the test configuration class 28, the health monitor class 30, and the node manager 96 are stored in the Infrastructure layer of software of the program 22.

TABLE 6 illustrates a table listing all of the attributes 92 (FIG. 5) for the test configuration class 28 (FIG. 5). The Execute attribute is a pointer to the diagnostic tests 50 of the test configuration class 28 (FIG. 1). The diagnostic test 50 can be in the form of a board support package (BSP) function or a wrapper function. In the embodiment as illustrated, the return type of the diagnostic test 50 is an unsigned eight-bit number where there are no parameters passed. The expected resulting value of the diagnostic test 50 is the PassValue attribute, which is an unsigned eight-bit number. The TroubleCodeId attribute has an associated DTC ID (Diagnostic Trouble Code Identification), where the TroubleCodeid is an unsigned sixteen-bit number.

TABLE 2

```
/*
* TeINF_e_ExecutionMode Definition
*/
typedef enum
{
    CeINF_e_DisableExecution = 0
    CeINF_e_OnlyStartupMode = 1
    CeINF_e_OnlyRunMode = 2
    CeINF_e_ExcludeShutdownMode = 3
    CeINF_e_OnlyShutdownMode = 4
    CeINF_e_ExcludeRunMode = 5
    CeINF_e_ExcludeStartupMode = 6
    CeINF_e_AllModes = 7
} TeINF_e_ExecutionMode;
```

TABLE 6

| /*Class Public Attributes */<br>#define att_CsINF_h_TestCfg \<br>  EXTENDS att_CsINF_h_Root \ | |
|---|---|
| u8 (*Execute) ( ); | /*address of the BSP function |
| u8 e_y_PassValue; | /*the expected resulting value of the test |
| u16 e_d_TroubleCodeId; | /*the associated DTC ID |
| atu_u16 e_atu_period; | /*how often the test is to run |
| atu_u16 e_DelayOffset; | /*a time delay before the test runs for 1$^{st}$ time |
| TeINF_e_ExecutionMode e_e_ExecutionMode; | /*when test should run; i.e., init, step, terminate |
| u8 e_y_FailureCount; | /*fault tolerance threshold; fault raised when exceeded |
| boolean e_b_ProcessorRelated; | /*flag indicating if test is related to proc integrity |
| TeINF_e_FaultSeverityLevel e_y_FaultSeverityLevel | /*each bit represents a fault severity level (MSb is high) |

Figure 6:
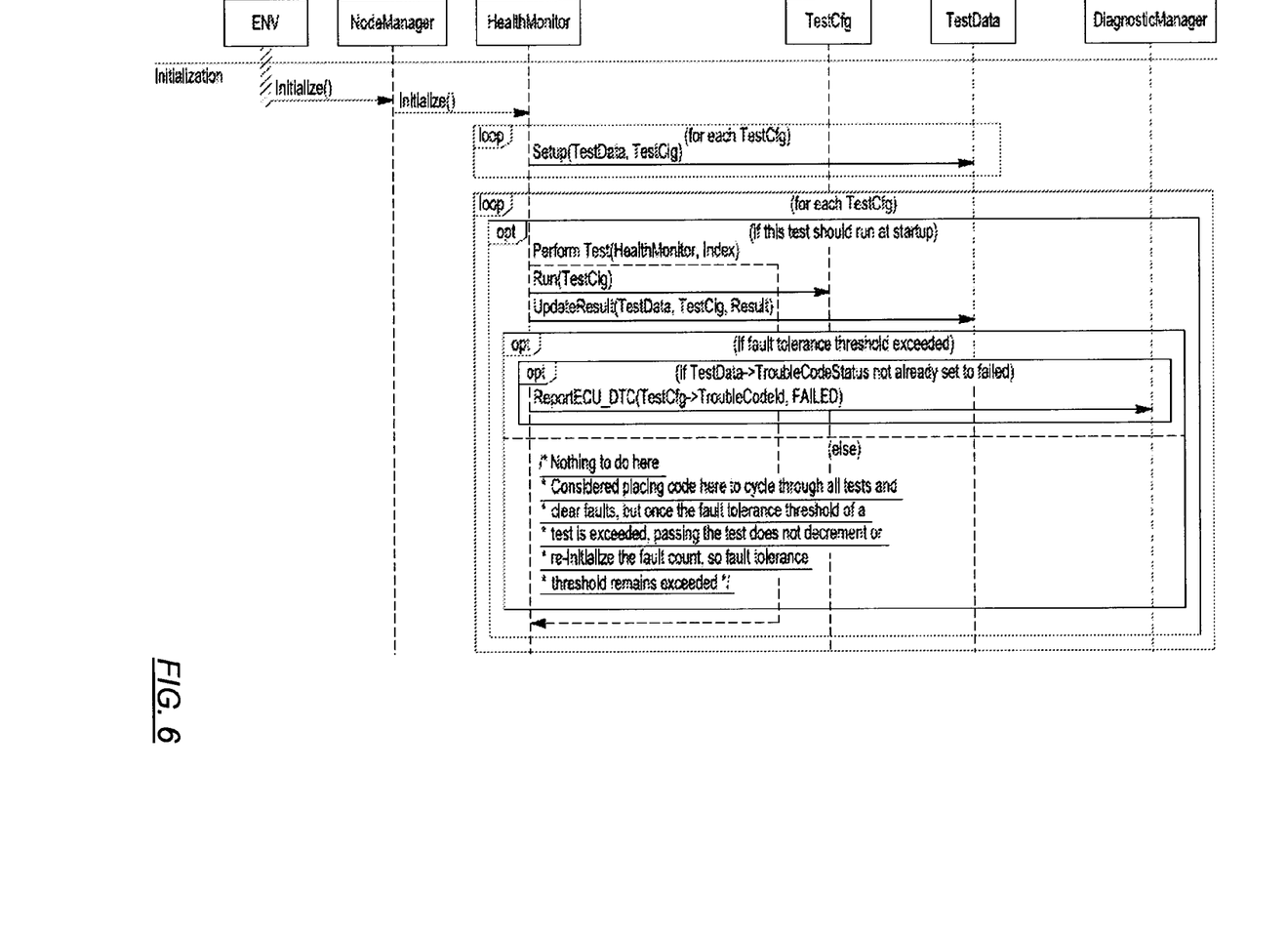
FIG. 6 is a sequence table for startup of a testing system.

Referring to FIG. 6, a sequence table for startup of the testing system 10 is illustrated. During setup, the health monitor class 30 executes diagnostic tests intended to run during setup. The diagnostic tests that are run during setup are determined based on the value of the Execution Mode (shown in TABLE 2). Turning to FIG. 7, a sequence table for run time The DelayOffset attribute allows for each of the diagnostic tests 50 of the test configuration class 28 (FIG. 1) that are scheduled at the same rate (i.e., the same period attribute atu_Period) to be offset. That is, the DelayOffset attribute prevents the diagnostic tests 50 that have the same period attribute atu_Period from deploying all at the same time.

Referring to FIG. 4, the attribute atu_Period allows for each of the tests 1-6 to include a period of 1000 milliseconds. The DelayOffset attributes causes each test to be offset from one another by 100 milliseconds.

Referring back to TABLE 6, the attribute Execution Mode indicates if a diagnostic test will execute during startup, run time mode, shutdown, or any combination of the modes. The attribute FailureCount indicates the fault tolerance of the diagnostic test 50. The ProcessorRelated attribute is a flag indicating if a particular diagnostic test 50 should be considered when setting the value of the ProcessorFailure attribute of the health monitor class 30 (TABLE 11). The attribute FaultSeverityLevel is an attribute that indicates the level of severity should a particular diagnostic test fail. The health monitor class 30 also includes an attribute that is named FaultSeverityLevel as well (TABLE 11). Referring to TABLE 11, the attribute FaultSeverityLevel of the health monitor class 30 is used to indicate what severity levels have failed diagnostic tests. TABLE 7 illustrates an exemplary list of fault severity levels associated with the FaultSeverityLevel of the test configuration class 28. In the embodiment as illustrated in TABLE 7, there are eight different fault severity levels that correspond with eight bits associated with the FaultSeverityLevel of the health monitor class 30. For example, if a diagnostic test 50 fails and has a fault severity attribute of CeINF_y_FaultSeverityLvl4 as determined by the attribute FaultSeverityLevel of the test configuration class 28, then the FaultSeverityLevel of the health monitor class 30 will have the fourth bit set. Alternatively, if two diagnostic tests 50 fail and one has a fault severity attribute of CeINF_y_FaultSeverityLvl4 and the other CeINF_y_FaultSeverityLvl6, then the FaultSeverityLevel of the health monitor class 30 will have the fourth bit as well as the sixth bit set.

TABLE 7

```
typedef enum
{
    CeINF_y_FaultSeverityLvl1 = 0x01,
    CeINF_y_FaultSeverityLvl2 = 0x02,
    CeINF_y_FaultSeverityLvl3 = 0x03,
    CeINF_y_FaultSeverityLvl4 = 0x04,
    CeINF_y_FaultSeverityLvl5 = 0x05,
    CeINF_y_FaultSeverityLvl6 = 0x06,
    CeINF_y_FaultSeverityLvl7 = 0x07,
    CeINF_y_FaultSeverityLvl8 = 0x08,
} TeINF_e_FaultSeverityLevel;
```

TABLE 8 illustrates a table listing all of the operations 94 that can be undertaken by the test configuration class 28. The operations 94 of the test configuration class 28 calls the diagnostic test 50 in the form of a board support package (BSP) function or a wrapper function, and returns the diagnostic test 50 as an unsigned eight-bit number.

TABLE 8

```
/*Class Public Operations
#define ops_CsINF_h_TestCfg
    EXTENDS ops_CsINF_h_Root
    u8 (*Run) (OBJECT_PTR);
```

Turning now to TABLE 9, a table illustrating all of the attributes 92 of the test data class 26 is shown. The DelayTimer attribute is initialized with the DelayOffset attribute of the test configuration class 28 (shown in TABLE 6). The DelayTimer attribute is initialized with the time indicated in the DelayOffset attribute. The DelayTimer attribute is decremented every time (i.e. until zero) that the operation UpdateTimers of the test data class 26 is called (the UpdateTimers function is listed in the table shown in TABLE 10). The DelayTimer attribute is considered only in run mode of the testing system 10. The attribute ExecutionTimer is initialized with the attribute atu_Period of the test configuration class 28 (shown in TABLE 6). The ExecutionTimer is then decremented by the time indicated in atu_Period of the test configuration class 28 each time that the operation UpdateTimers is called (TABLE 10). Specifically, if the DelayTimer attribute value is greater than zero, then DelayTimer gets decremented by the time indicated in atu_Period. Otherwise, if ExecutionTimer is greater than zero, then ExecutionTimer gets decremented by the time indicated in atu_Period. The ExecutionTimer attribute is considered only in run mode of the testing system 10. The FailCounter attribute is used to keep a running count of how many times a diagnostic test 50 has consecutively failed. If the value of FailCounter exceeds a threshold value of the attribute FailureCount of the test configuration class 28 (shown in TABLE 6), then the corresponding TroubleCodeId attribute of the test configuration class 28 is set to a particular DTC ID.

TABLE 9

```
/*Class Public Attributes */
#define att_CsINF_h_TestData \
    EXTENDS att_CsINF_h_Root \
    atu_u16 e_DelayTimer;          /*timer used prior to first execution of test
    atu_u16 e_ExecutionTimer;      /*timer indicating when to perform test
    u8 e_y_TestResult;             /* result of the test performed
    u8 e_y_FailCounter;            /* a running count of tests failed
    u8 e_y_TroubleCodeStatus;      /* a flag indicating if the DTC has been
                                      set
```

TABLE 10 is a table illustrating the operations 94 of the test data class 26. The UpdateTimers operation decrements the specified time from the atu_DelayTimer attribute from the test data class 26 (TABLE 9), the ExecutionTimer attribute from the test data class 26 (TABLE 9), or a combination of both the attributes atu_DelayTimer and ExecutionTimer. The UpdateTimers operation then returns a Boolean value indicating if the ExecutionTimer has expired or not. In one embodiment the Boolean value has a false value represented as zero and a true value represented by any non-zero value such as, for example, the number 1. The UpdateResult operation receives the results of a diagnosic test performed on the control module 18 (FIG. 1), and compares the value to an expected result from the PassValue attribute, which is part of the test configuration class 28 (TABLE 6). If the value of the diagnostic test is different from the value of the PassValue attribute, then the UpdateResult increments the FailCounter attribute of the test data class 26. The UpdateResult attribute then returns a Boolean value indicating if the FailCounter exceeds the fault tolerance threshold value of the FailureCount attribute of the test configuration class 28 (TABLE 6). The Setup operation initializes all of the attributes of the test data class 26 based on the configured values of the corresponding instances of the test configuration class 28. Finally, the Reset operation clears indication of all faults.

TABLE 10

```
/*Class Public Operations */
#define att_CsINF_h_TestData \
    EXTENDS att_CsINF_h_Root \
    boolean (*UpdateTimers)(OBJECT_PTR,
    OBJECT_REF (CsINF_h_TestCfg,Lp_TestCfgObj),
    atu_u16 period);
    boolean (*UpdateResult)(OBJECT_PTR,
```

TABLE 10-continued

```
OBJECT_REF (CsINF_h_TestCfg,Lp_TestCfgObj),
u8 result); \
void(*Setup) (OBJECT_PTR,
    OBJECT_REF (CsINF_h_TestCfg,Lp_TestCfgObj));\
void (*Reset) (OBJECT_PTR);
```

TABLE 11 is a table illustrating the attributes 92 of the health monitor class 30. The ProcessorFailure attribute indicates if one or more diagnostic tests have failed. The ProcessorRelated attribute of the test configuration class 28 (TABLE 6) is a flag indicating if a particular diagnostic test 50 should be considered when setting the value of the ProcessorFailure attribute of the health monitor class 30. The attribute ProcessorRelated from the test configuration class 28 (TABLE 6) is used to indicate if a particular diagnostic test should be considered when setting the ProcessorFailure flag of the health monitor class 30.

TABLE 11

```
/*Class Public Attributes */
#define att_CsINF_h_HealthMonitor \
    EXTENDS att_CsINF_h_RunnableBlock\
    Boolean e_b_ProcessorFailure;\
    u8 e_y_FaultSeverityLevel;\
    OBJECT (CsINF_h_TestData, a_h_itsTestData[32]); \
    const obj_CsINF_h_TestCfg* p_h_itsTestConfig;
```

The FaultSeverityLevel attributes indicates the severity level associated with any failed diagnostic test. Specifically, the FaultSeverityLevel indicates the level of severity that the attribute FaultSeverityLevel from the test configuration class 28 (shown in TABLE 6) needs to be in order to fail. Each bit of the FaultSeverityLevel attribute of the health monitor instance is a bit-wise OR of the FaultSeverityLevel attribute off all instances of the test configuration class 28 (shown in TABLE 6). An example of how the FaultSeverityLevel is expressed as a signal is illustrated in TABLE 12.

TABLE 12

```
#define VsINF_h_NodeManager_FaultSeverityLevel_rsp \
    VsINF_h_NodeManager_.p_h_itsHealthMonitor->
    e_y_FaultSeverityLevel
```

The TestData attribute is an indication of how many instances or diagnostic tests 50 are performed. Specifically, the instances 52 of the test data array 42 (shown in FIG. 1) correspond to one of the instances 50 of the test configuration array 46 (shown in FIG. 1), where the results of each diagnostic test are stored in the instances 52 of the test data array 42. In the embodiment as shown, there can be up to thirty-two instances 50 of the test configuration class 46 that are diagnostic tests. There are also thirty-two instances 52 included with the test data array 42, which is illustrated as a_h_itsTestData[32]. However, it is understood that any predetermined number of diagnostic tests may be included with the test data array 42 as well. Finally, the p_h_itsTestConfig attribute is pointer to diagnostic tests 50 that are instances of the test configuration class 28.

TABLE 13 is a table illustrating the operations 94 of the health monitor class 30. The PerformTest function is used to indicate if there are any errors that are produced by performing the diagnostic tests of the test configuration class 28. Specifically, the PerformTest function calls the UpdateResult operation of the test data class 26 (shown in TABLE 10). The UpdateResult operation receives the results of a diagnoisc test 50, and compares the value to the fault tolerance threshold value. The PerformTest function receives a return flag from the UpdateResult operation if the value from has been exceeded, and a trouble code is either set or cleared based on the UpdateResult operation. Specifically, the UpdateResult operation is set or cleared based on the TroubleCodeId attribute of the test configuration class 28 (TABLE 6), which has an associated DTC ID attribute.

TABLE 13

```
/* Prototypes for private functions */
static void PerformTest (OBJECT_PTR Lp_h_This, u16 Le_d_Index);
/* Prototypes for public functions */
static ctrl_status Initialize (OJBECT_PTR Lp_h_This);
static ctrl_status Run (OJBECT_PTR Lp_h_This, atu_u16 period);
static void Terminate (OJBECT_PTR Lp_h_This);
static void ResetAllDiagnostics (OJBECT_PTR Lp_h_This);
static void ClearAllDiagnostics (OJBECT_PTR Lp_h_This);
```

The PerformTest function of the health monitor class 30 then calls a particular diagnostic test 50 of the test configuration class 28. If the flag of the ProcessorRelated attribute of the test configuration class 28 (TABLE 6) is set, this means that the particular diagnostic test 50 of the test configuration class 28 should be considered when setting the ProcessorFailure flag of the health monitor class 30 (TABLE 11). Thus, if the ProcessorFailure attribute of the test configuration instance is set, and if the particular test configuration instance has failed the associated diagnostic test, then the ProcessorFailure attribute of the health monitor instance is set, indicating an error has occurred.

The Initialize function calls the Setup function (TABLE 10) of each instance 52 of the test data class 26 to initialize the attributes of the test data class 26, where each instance 52 of the test data class 26 is based on a corresponding instance or diagnostic test 50 of the test configuration class 28. The Initialize function then checks each Execution Mode attribute (TABLE 6) of the test configuration class 28 associated with one of the diagnostic tests 50, and will execute the diagnostic test 50 if intended to run during startup of the testing system 10. The Run function checks the Execution Mode attribute of the test configuration class 28 for each diagnostic test 50 of the test configuration class 28, and calls the UpdateTimers function (TABLE 10) of the test data class 26 if the diagnostic test 50 is supposed to run during run mode of the testing system 10. If the UpdateTimers function is expired, then the diagnostic test 50 is executed. The Terminate function checks the Execution Mode attribute of the test configuration class 28 for each diagnostic test 50 of the test configuration class 28, and executes the diagnostic test 50 if the diagnostic test 50 is intended to run during shutdown of the testing system 10.

With continued reference to FIGS. 1-5, a method of testing the microprocessors associated with the control module 18 (FIG. 1) is generally described. The method begins at a first step where the control module 18 includes control logic for associating the test data class 26, the test configuration class 28, and the health monitor class 30 in the core infrastructure 40 of the program 22. The data contained in the core infrastructure 40 is static. That is, the data contained in the core infrastructure 40 does not generally change during the life of the test system's software. The method may then proceed to a second step.

In the second step, the control module 18 includes control logic for associating the configuration data instances 50 in the deployment specific portion 44 of the program 22. Specifically, referring to FIGS. 1-2, the instances 50 of the test configuration array 46 are diagnostic tests that are used to monitor a parameter of the microprocessor of the control module 18. The deployment-specific structure 44 is dynamic. That is, the data stored in the deployment specific structure 44 is configurable and can be changed during the lifetime of the testing system's software. Referring to TABLE 1, an exemplary set of diagnostic tests are illustrated for different types of control modules 18. Specifically, ECU1 includes a set of diagnostic tests that are unique to ECU1, and the second ECU2 includes a set of diagnostic tests that are unique to ECU2. For example, ECU1 could be a body control module while ECU2 could be a battery contact module. Because the diagnostic tests are stored in the dynamic deployment specific structure 44 of the control module 18, each control module 18 can have a configurable set of diagnostic tests that can be tailored depending on the type of control module that is employed. The method may then proceed to a third step.

In the third step, the control module 18 includes control logic for executing the configuration data instances 50. That is, the control module 18 executes the diagnostic tests 50 that are associated with the test configuration array 46 of the test configuration class 28 (FIGS. 1-2). The diagnostic tests are used to monitor a particular parameter of the microprocessor of the control module 18. The method may then proceed to a fourth step.

In the fourth step, the control module 18 includes control logic for monitoring the control module 18 for a data signal indicating that an error code has been generated. Specifically, TABLE 13 illustrates the operations 94 of the health monitor class 30, where the PerformTest function is used to indicate if there are any errors that are produced by performing the diagnostic tests of the test configuration class 28. The PerformTest function calls the UpdateResult operation of the test data class 26 (shown in TABLE 10). The UpdateResult operation receives the results of a diagnosic test 50, and compares the value to the fault tolerance threshold value. The PerformTest function receives a return flag from the UpdateResult operation indicating if the fault tolerance threshold has been exceeded, and a trouble code is either set or cleared based on the UpdateResult operation.

The PerformTest function of the health monitor class 30 then calls a particular diagnostic test 50 of the test configuration class 28. As discussed above, if the flag of the ProcessorRelated attribute of the test configuration class 28 (TABLE 6) is set, this means that the particular diagnostic test 50 of the test configuration class 28 should be considered when setting the ProcessorFailure flag of the health monitor class 30 (TABLE 11). Thus, if the ProcessorFailure attribute of the test configuration instance is set, and if the particular test configuration instance has failed, then the ProcessorFailure attribute of the health monitor instance is set, indicating an error has occurred within one of the microprocessor of the control module 18. Once the control module 18 has determined if any of the diagnostic tests have failed, then the method may then proceed to a fifth step.

In the fifth step, the control module 18 includes control logic for storing the results of the diagnostic tests in the instances 52 of the test data array 42. The instances 52 (shown in FIG. 1) of the test data array 42 each correspond to one of the instances 50 of the test configuration array 46. The monitor class 30 is employed to create one instance 52 of the test data array 42 for each instance 50 for the test configuration array 46. The results of each diagnostic test are stored in the instances 52 of the test data array 42. Thus, the instances 52 of the test data array 42 acts as a container to store the results of each instance 50 of the test configuration array 46. The method may then proceed to a sixth step.

In the sixth step, the control module 18 includes control logic for determining if the microprocessor of the control module 18 should continue to be monitored. If it is determined that the microprocessor should continue to be monitored, then the method returns to the second step. If it is determined that the microprocessor no longer needs to be monitored, then the method may terminate. Whether or not the microprocessor should continue to be monitored depends on the value of the Execution Mode (shown in TABLE 2) and if the testing system 10 is in startup mode, run time mode, or shutdown mode, or any combination of these modes. For example, referring to TABLE 2, if the Execution Mode value is set to OnlyStartupMode, diagnostic testing will only occur during startup. Therefore, once the testing system 10 has determined if the diagnostic tests have generated an error code during startup, the method will terminate and not return to the second step. In another example, if the Execution Mode value is set to AllModes, then diagnostic testing is run in startup, run time and shut down. Therefore, once the testing system 10 has determined if the diagnostic tests have generated an error code during startup, the method returns to the second step. The method is then executed again for run time mode as well as shutdown mode. When the method is at the sixth step during shut down mode, the method then terminates.

The description of the invention is merely exemplary in nature and variations that do not depart from the gist of the invention are intended to be within the scope of the invention. Such variations are not to be regarded as a departure from the spirit and scope of the invention.

What is claimed is:

1. A control module having a microprocessor, comprising:
 a programming environment having a test data structure, a configuration data structure, and a monitor data structure each containing data; and
 at least one test data instance that is associated with the test data structure and at least one configuration data instance that is associated with the configuration data structure, wherein the at least one configuration data instance is a diagnostic test that monitors a parameter of the microprocessor, and the monitor data structure creates the at least one test data instance such that each of the at least one test data instance corresponds to one of the at least one configuration data instances, and wherein the programming environment includes:
 a first control logic for associating the test data structure, the configuration data structure and the monitor data structure as part of a core infrastructure portion of the programming environment, wherein the core infrastructure portion of the programming environment is static;
 a second control logic for associating the at least one configuration data instance in a deployment-specific portion of the program, wherein the deployment-specific portion of the programming environment is dynamic,
 a third control logic for executing the at least one configuration data instance that is the diagnostic test to monitor one of the parameters of the microprocessor;
 a fourth control logic for monitoring the microprocessor for a data signal indicating that an error code has been generated, wherein the error code is generated by executing the at least one configuration data instance; and
 a fifth control logic for storing the results of the diagnostic test in the at least one test data instance.

2. The system as recited in claim 1 wherein each diagnostic test is deployed at an offset, wherein the offset represents a delay in time.

3. The system as recited in claim 2 wherein the delay in time is 1000 milliseconds.

4. The system as recited in claim 1 wherein the test data structure includes thirty-two diagnostic tests.

5. The system as recited in claim 1 wherein the configuration data structure includes up to thirty-two diagnostic tests.

6. The system as recited in claim 1 wherein the system includes an execution mode, wherein the execution mode determines if a specific diagnostic test executes depending on if the microprocessor is in one of startup, run time mode and shutdown.

7. The system as recited in claim 1 wherein the microprocessor is one of an airbag control module, a body control module, a battery contactor module, an engine control module, a powertrain control module, a vehicle integration control module, and a transmission control module.

8. The system as recited in claim 1 wherein a DTC ID (diagnostic trouble code identification) is associated with each error code.

9. The system as recited in claim 1 wherein a plurality of fault severity levels are associated with the error code.

10. The system as recited in claim 1 wherein multiple configuration data instances that are diagnostic tests are used to monitor different parameters of the microprocessor.

11. The system as recited in claim 10 wherein one of the diagnostic tests is a stack usage test that indicates a percentage of a stack utilized.

12. A method of testing a control module having a microprocessor having a program including a test data structure, a configuration data structure, and a monitor data structure, where at least one test data instance is associated with the test data structure and at least one configuration data instance is associated with the configuration data structure, and the at least one configuration data instance is a diagnostic test that monitors a parameter of the microprocessor, and the monitor data structure creates the at least one test data instance such that each of the at least one test data instance corresponds to one of the at least one configuration data instances, comprising:

associating the test data structure, the configuration data structure, the monitor data structure with a core infrastructure portion of the program and associating the at least one configuration data instance with a deployment-specific portion of the program, wherein the core infrastructure portion of the program is static and the deployment-specific portion of the program is dynamic;

executing the at least one configuration data instance, where the at least one configuration data instance is the diagnostic test that monitors one of the parameters of the microprocessor;

monitoring the microprocessor for a data signal indicating that an error code has been generated by the diagnostic test being executed, wherein the error code is generated by executing the at least one configuration data instance; and storing results of the diagnostic test in the at least one test data instance.

13. The method of claim 12 further comprising the step of determining if the control module will continue monitoring the microprocessor for data signals indicating that the error code has been generated.

14. The method of claim 12 further comprising the step of deploying each diagnostic test at an offset, wherein the offset represents a delay in time.

15. The method of claim 14 wherein the delay in time is 1000 milliseconds.

16. The method of claim 12 further comprising the step of executing a specific diagnostic test depending on an execution mode, wherein the execution mode determines if the specific diagnostic test executes depending on if the microprocessor is in one of startup, run time mode and shutdown.

17. The method of claim 12 further comprising the step of establishing a first fault severity level associated with the configuration data structure, wherein the first fault severity level indicates a level of severity of one of the diagnostic tests if the error code is generated by the microprocessor, and wherein there are eight levels of severity for the first fault severity level.

18. The method of claim 17 further comprising the step of establishing a second fault severity level associated with the monitor data structure, wherein the second severity level indicates at which of the eight levels of severity the first fault severity level is generated.

19. The method of claim 18 further comprising the step of establishing an eight-bit set that is associated with the second fault severity level of the monitor data structure, and wherein each bit of the eight-bit set corresponds to one of the eight levels of severity for the first fault severity level.

20. The method of claim 12 further comprising the step of establishing multiple configuration data instances that are diagnostic tests are used to monitor different parameters of the microprocessor.

\* \* \* \* \*